Sept. 29, 1964
L. F. BERHENKE
3,150,514
AUTOMATIC MELTING POINT RECORDER
Filed April 17, 1961
2 Sheets-Sheet 1
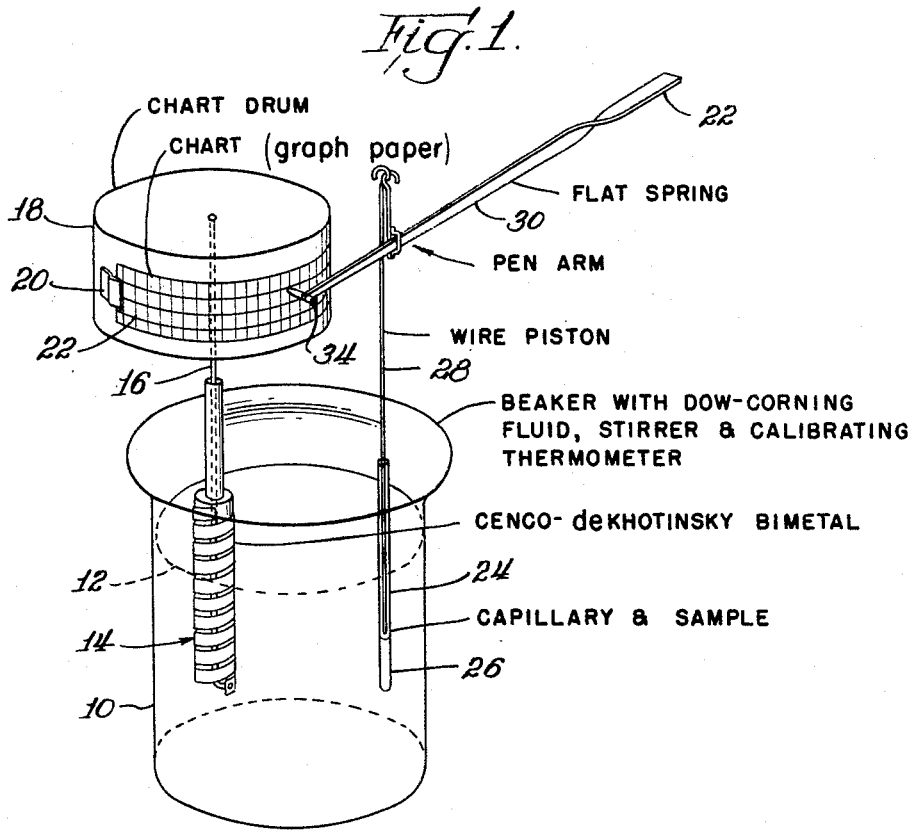
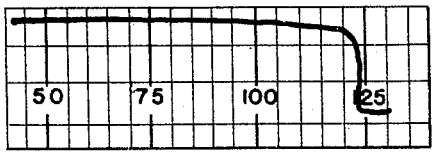
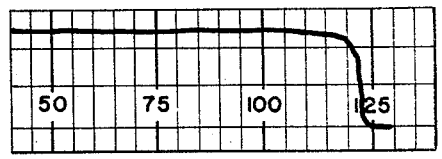
INVENTOR.
Luther F. Berhenke

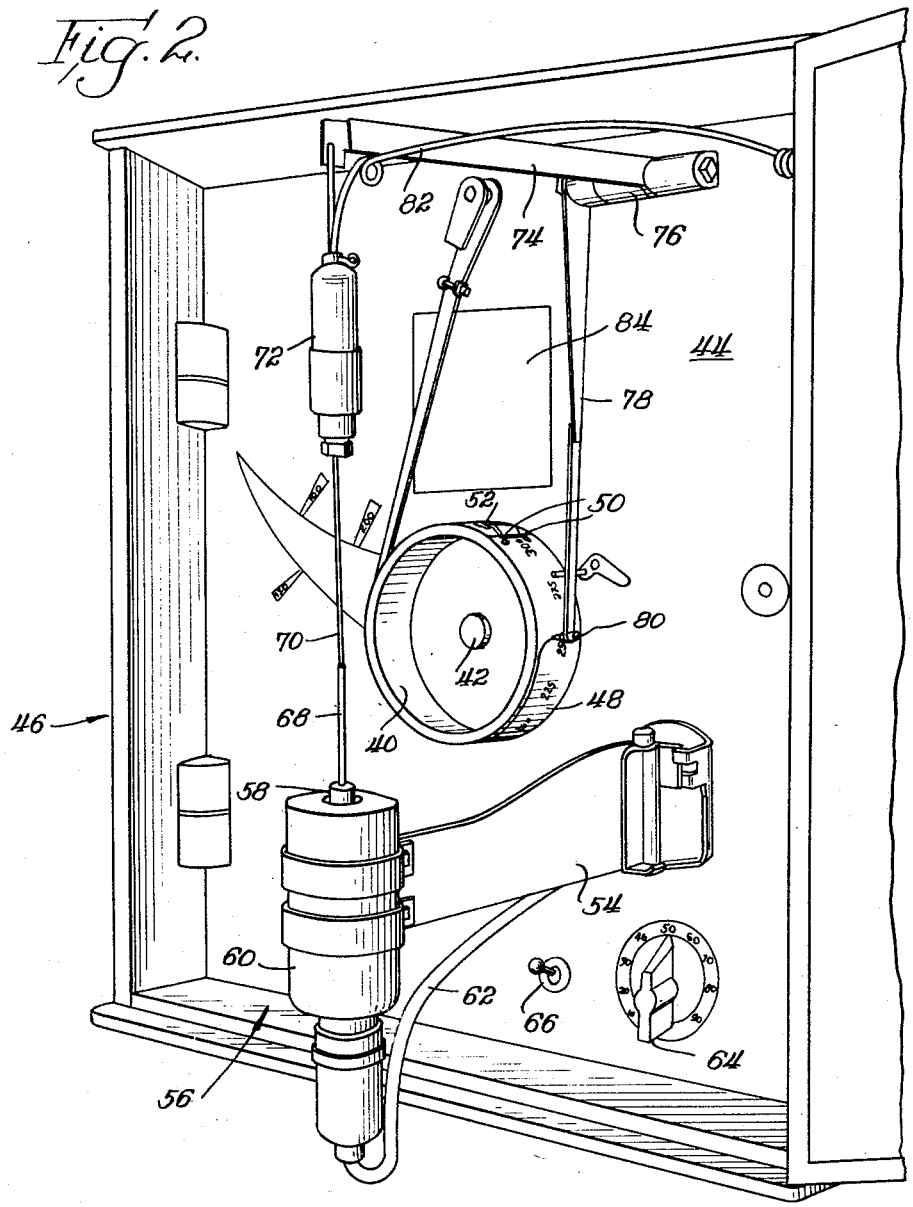

United States Patent Office 3,150,514  
Patented Sept. 29, 1964

3,150,514  
AUTOMATIC MELTING POINT RECORDER  
Luther F. Berhenke, Midland, Mich., assignor to The Dow Chemical Company, Midland, Mich., a corporation of Delaware  
Filed Apr. 17, 1961, Ser. No. 103,458  
8 Claims. (Cl. 73—17)

This invention relates to an automatic melt point recorder for use in chemical analysis.

Many compounds, and most pure ones, are characterized by having a sharp melt point, and such criterion is frequently used in chemical analysis, especially in the field of organic chemistry. However, melt point determinations are time consuming since slow heating and constant observation are normally required.

The apparatus of the present invention produces results that compare favorably with those made by visual subjective observations, and is fast, simple to operate, and utilizes only milligrams of sample. In addition, the apparatus of the invention requires little attention during operation, and produces a permanent record.

Briefly, the subject apparatus includes a thin walled capillary tube in which a small piston is arranged to seat upon a sample of material whose melt point is to be determined. The piston is connected to an arm means having a stylus for recording piston movement upon a rotatable drum. The latter is driven by recorder apparatus operable in accordance with temperature change of the sample. The capillary tube is positioned in a heat pot, which preferably is electrically heated. As the temperature of the sample nears melt point it shrinks, and subsequently melts, resulting in movement of the piston, which movement is recorded on the drum. The apparatus of the invention produces results which are relatively independent of sample heating rate, and which have an accuracy limited only by the accuracy of the recorder apparatus. In one of the embodiments described hereinafter, results achieved were within ±0.5° C. of standard melt temperature for the compounds being analyzed.

The main object of this invention is to provide apparatus for automatically recording melt point of a given material.

A more specific object is to provide an automatic melt point recorder which produces results that compare favorably with those made by visual subjective observations.

Still another object is to provide an automatic melt point recorder which is fast, simple to operate, and utilizes only milligrams of sample.

Another object is to provide an automatic melt point recorder requiring little attention during operation, and which produces a permanent record.

A further object is to provide an automatic melt point recorder which produces results relatively independent of sample heating rate.

These and further objects and features of the invention will become more apparent from the following description and accompanying drawings wherein:

FIG. 1 is a perspective-like view of a simplified model embodying the principles of the invention;

FIG. 2 is a perspective-like view of a more advanced model embodying the principles of the invention; and FIGS. 3 and 4 illustrate typical melt curves obtained with use of the apparatus of FIG. 2.

Referring now to the drawings, and more particularly to FIG. 1, numeral 10 identifies a beaker, or container, for a given quantity of fluid 12, such as oil, in which is immersed a stirrer and a calibrating thermometer (neither shown). Means are provided for heating the fluid 12 to a temperature as required for melting the sample of material being analyzed. A bimetal helix assemblage 14, such as used in a Cenco-DeKhotinsky thermo-regulator, is arranged for submersion in the fluid 12. A rotatable shaft 16 projecting vertically from the upper end of the assemblage 14, is arranged to support a cylindrical chart drum 18. Heating of the helix assemblage 14, will cause rotation of the shaft 16, in the well known manner. Clip means 20, are affixed to the drum for use in removably securing a strip of chart paper 22 about the periphery of the drum an angular distance of approximately 330°.

A capillary tube 24 is arranged for submersion in the fluid 12, the lower end of the tube being closed whereby a small sample of material 26 may be contained therein. A piston, preferably in the form of a metal wire 28, is slidably arranged in the tube 24, the lower end of the piston resting upon the sample 26, the upper end being secured to a pen arm 30 which is supported in a generally horizontal position. The pen arm 30, is formed of a flat spring, one end 32 being bent at a right angle to the body of the pen arm so that the arm may be affixed to a support (not shown) in a manner providing for vertical movement of the arm about the fixed end. At the free end of the arm a marking means, such as a stylus 34, is affixed for marking an ink line upon the chart paper 22 as the drum 18 revolves. For the sake of simplicity, means for mounting the various elements have not been illustrated, however, such details would pose no problem for those skilled in the art.

The operation of the above-identified device is very simple. A strip of chart paper 22 having a calibrated scale of sufficient range for the temperature spread expected to be encountered, is affixed in position upon the drum 18. A sample of material being analyzed for melt point is put in the capillary to a depth of 1.5 to 2.0 cm., and the piston 28 is inserted in the capillary to rest upon the sample. The loaded capillary, with the piston extending therefrom, is placed in the fluid 12, and the piston is affixed to the pen arm 30. Next the stylus 34 is adjusted upon the chart paper so that the marking point of the stylus contacts the paper at a temperature indication corresponding to the temperature of the fluid 12. The fluid is then heated to whatever temperature is necessary to cause melting of the sample 26. As the fluid temperature increases, the bimetal assemblage 14 will cause rotational movement of the drum 18, and a line will be marked by the stylus upon the chart. The line will be substantially horizontal until the melt temperature of the sample is reached, at which point the line will drop abruptly, in the manner illustrated in either of the examples of FIGS. 3 and 4, or in some other pattern peculiar to the type and purity of the material being analyzed.

While the simplified model could be expected to provide results within 2° C. of established melt point temperatures for given samples, which results may not be sufficiently accurate in many cases, it does clearly illustrate the operating principles of the inventive concept, and exhibits other desirable features associated with the invention, such as, providing fast results, simplicity of operation, use of small samples, requires little attention during operation, and provides a permanent record.

A more refined model embodying the principles of the invention, and capable of melt point determinations within ±0.5° C. accuracy, is illustrated in FIG. 2. The basic unit included in the refined model may be similar to a (0–300° C.) Minneapolis-Honeywell Brown "Electronik" recorder and thermo-couple, modified as described below.

A cylindrical chart drum 40 is axially mounted upon a shaft 42 which projects horizontally through a wall 44 forming part of a recorder 46. A drive means (not shown) is arranged in the recorder, which drive means is adapted to rotate the drum in accordance with changes in sample temperature. The drum 40 has means for holding a paper strip chart 48 upon the periphery thereof, which holding means may comprise two index pins 50 for anchoring one end of the paper chart, while a spring clip 52 is arranged for holding the other end of the strip chart.

A swing-out arm 54 is mounted upon the wall 44, which arm is similar to that used on a wall type can opener, and which may be selectively locked in a vertical plane normal to the plane of the wall 44. Affixed to the end of the arm 54 is a sample heating assemblage 56, including a tubular melting block 58, surrounded by a heater element 60 enclosed in appropriate thermal insulation. The heater element is preferably of the electrical type, such as used on a soldering iron (American Beauty No. 9273). Current is supplied to the heater element via an insulated wire 62, leading from a small variable transformer (not shown) regulated by a control knob 64. Heater current is controlled by a switch 66 mounted upon the wall 44 of the recorder.

A capillary tube 68 is positionable within the melting block 58, which tube has a closed lower end so that a small sample of the material under analysis may be held. Slidably arranged in the tube in substantially friction-free engagement, is a thermo-couple 70 which serves as a piston and which rests upon the sample. The couple itself is at the lower extremity of the piston so that the temperature measured is that of the sample being heated. The thermo-couple is affixed to a connector block 72 which is suspended from one end of a piston arm 74, the other end of the arm being secured to a sleeve, or shaft 76, rotatably mounted in conical pivot bearings supported upon the wall 44. In the embodiment being described, the thermocouple and connector block weighed about 30 grams which subjected the sample to a pressure of approximately 50 p.s.i. However, the effect of such weight upon the melting point of a sample was estimated to be less than 0.2° C.

A pen arm 78, affixed to the shaft 76, has a marking means, such as an inking stylus 80, arranged at the lower end. The latter is adapted for contacting the drum chart 48, so that as the drum rotates a line will be drawn upon the chart. A spring loaded friction clutch is preferably arranged between one of the arms 74 or 78 and the shaft 76, so that the relative angular position of the two arms can be adjusted. It will be seen that rotary movement of the piston arm 74, will cause rotary movement of the pen arm 78. A wire 82 extends between the connector block 72 and the apparatus which drives the drum 40, whereby the latter is rotated in accordance with the temperature sensed by the thermo-couple, in a well known manner.

It will be noted that the arms 54 and 74 may be swung back toward the wall 44, so that a cover (not shown) may be used to close the recorder.

In working with samples of material which would be corrosive to metal, a glass piston rod may be used, and the thermo-couple inserted in the melting block in close proximity to the sample being analyzed.

Operation of the above described apparatus is quite simple. A strip chart 48 is affixed to the drum 40, and a sample of material is placed in the capillary to a depth of 1.5 to 2 cm., which is then placed in the melting block 58. The thermo-couple piston 70 is then inserted in the capillary so that the lower end rests upon the sample. The stylus 80 is then adjusted upon the chart 48, at a temperature marking which corresponds to the initial temperature of the sample. Next, the melting block 58 is heated by turning on the current, the heating rate being adjusted to desired value. In this connection, it will be found useful to devise a heating rate chart 84, which indicates heating curves for various settings of the variable transformer, which chart may be affixed to the wall 44 of the recorder. However, it will be found that the heating rate will not usually be critical. As the melt point of the sample is reached, the piston 70 will move downwardly, and such movement will be recorded on the chart 48.

The accuracy of melt point temperature, is essentially that of the recorder, as has been mentioned before. The shape of the curve made upon the chart is influenced to some extent by the packing of the sample, however, results obtained by various operators will be found to be in good agreement. Principal variation will be in the interpolated wetting and meniscus points, more with impure than with pure samples. The melting point is not so influenced. Because the apparatus measures only volume changes, subtle changes such as polymorphic transformations, desolvations, etc., without appreciable volume changes will not be recorded. However, shrinkages often unnoticed in a capillary, are vividly indicated in operation of the apparatus.

The relative unimportance of heat rate is illustrated in FIGS. 3 and 4, which indicate results obtained in melt point determinations of equivalent samples of benzoic acid with use of apparatus of the invention. The curve shown in FIG. 3 was obtained at a 2°/min. heat rate while the curve shown in FIG. 4 was obtained with an 8°/min. heat rate.

Generally, the final temperature on the recorder corresponds more closely to the initial melting point (meniscus) in a capillary or to the freezing point of a larger sample. The purer the sample, the closer the agreement.

Measurement of piston travel at several points indicates that, roughly, 10% travel corresponds to the "wetting" point and 25% travel to the meniscus point. This may not be true for irregular shaped curves, such as more often produced by impure samples, or where the several components of a given compound form eutectics.

From the foregoing, it will be seen that apparatus embodying the principles of the invention will achieve the objectives set forth hereinbefore.

The foregoing description has been given in detail without thought of limitation since the inventive principles involved are capable of assuming other forms without departing from the spirit of the invention or the scope of the following claims.

What is claimed is:

1. Melt point recorder apparatus comprising in combination, a thin walled capillary tube closed at one end for holding a sample of material for which determination of melt point temperature is desired, piston means positionable in said tube so that it can engage a sample in said tube, follower means responsive to movement of said piston means as the volume of the sample changes under the influence of heat, recorder means for recording movement of the follower means, and means to operate the recorder means in accordance with change of sample temperature.

2. Melt point recorder apparatus comprising in combination, a thin walled capillary tube closed at one end for holding a sample of material for which determination of melt point temperature is desired, piston means positionable in said tube so that it can engage a sample in said tube, follower means responsive to movement of said piston means as the volume of the sample changes under the influence of heat, recorder means for recording movement of the follower means, means to operate the recorder means in accordance with change in sample temperature, and heating means for raising the temperature of the sample.

3. Melt point recorder apparatus comprising in combination, a thin walled capillary tube closed at one end for holding a sample of material for which determination of melt point temperature is desired, a piston slidably arranged in said tube so that it may rest upon a sample in said tube, a recorder having a movable writing surface, means responsive to change in sample temperature to cause movement of the writing surface, and a linkage means arranged between the piston and said writing surface and including a marking means for recording the movement of said piston upon the writing surface as the volume of the sample changes under influence of heat.

4. Melt point recorder apparatus comprising in combination, a thin walled capillary tube closed at one end for holding a sample of material for which determination of melt point temperature is desired, a thermo-couple piston slidably arranged in said tube one end of which may rest upon a sample in said tube, a recorder having a movable writing surface, means to correlate movement of the writing surface with change of temperature of the sample material, a linkage means arranged between the piston and said writing surface and including a marking means for recording the movement of said piston upon the writing surface as the volume of the sample changes under influence of heat, and heating means for raising the temperature of the sample.

5. Melt point recorder apparatus comprising in combination, a thin walled capillary tube closed at one end for holding a sample of material for which determination of melt point temperature is desired, a thermo-couple piston slidably arranged in said tube so that the weight thereof may be supported by a sample in said tube, a recorder having a rotatable drum with a writing surface, means to correlate drum movement with change of temperature of the sample material, a linkage means arranged between the piston and said rotatable drum and including a stylus for recording the movement of said piston upon the writing surface of the drum, and heating means for raising the temperature of the sample.

6. Melt point recorder apparatus comprising in combination, a thin walled capillary tube closed at one end for holding a sample of material for which determination of melt point temperature is desired, a thermo-couple piston slidably arranged in said tube so that the end thereof may engage a sample in said tube, a recorder having a rotatable drum with a removable chart affixed thereto said chart having a calibrated writing surface thereon, a linkage means arranged between the piston and said rotatable drum and having a stylus for recording movement of said piston upon the writing surface of the drum, an electrical connecting means between said thermo-couple piston, and a control means adapted to cause operation of the drum recorder as a function of sample temperature.

7. Melt point recorder apparatus comprising in combination, a vertically arranged thin walled capillary tube closed at the lower end for holding a sample of material for which determination of melt point temperature is desired, a thermo-couple piston slidably arranged in said tube so that the lower end thereof may rest upon a sample in said tube, a recorder having a rotatable drum with a removable chart affixed thereto said chart having a calibrated writing surface thereon, a linkage means including arm members, one of said arm members being pivotally affixed to the upper end of the piston another of said arm members having a stylus engageable with the drum for recording movement of the piston as the volume of the sample changes under influence of heat, an electrical connecting means between said thermo-couple piston, and a control means adapted to cause operation of the recorder drum as a function of sample temperature.

8. Melt point recorder apparatus comprising, in combination, a thin walled capillary tube closed at one end for holding a sample of material for which determination of melt point temperature is desired, piston means positionable in said capillary tube so that it can engage a sample in said capillary tube, follower means responsive to movement of said piston means as the volume of the sample changes under the influence of heat, recorder means including a pen and writing surface, at least one of which is responsive to temperature differentials, for recording movement of the follower means, and means to operate the recorder means in accordance with change of sample temperature.

References Cited in the file of this patent

UNITED STATES PATENTS

| | | |
|---|---|---|
| 2,351,572 | Kingston | June 13, 1944 |
| 2,380,565 | Wetherbee | July 31, 1945 |
| 2,437,194 | Harrington | Mar. 2, 1948 |
| 2,690,674 | Thomas | Oct. 5, 1954 |
| 2,699,060 | Safford | Jan. 11, 1955 |

FOREIGN PATENTS

| | | |
|---|---|---|
| 378,498 | Germany | July 16, 1923 |
| 1,178,634 | France | Dec. 15, 1958 |